(12) United States Patent
Sanjeu et al.

(10) Patent No.: US 6,359,252 B1
(45) Date of Patent: Mar. 19, 2002

(54) METHOD FOR WELDING COATED SHEETS WITH AN ENERGY BEAM, SUCH AS A LASER BEAM

(75) Inventors: Catherine Sanjeu, Marcoussis; Mathieu Kielwasser, Barthenheim; Remy Fabbro, Antony; Bernard Criqui, Suresnes, all of (FR)

(73) Assignees: Automobiles Peugot, Paris; Automobiles Citroen, Neuilly-sur-Seine; Renault, Boulogne-Billancourt, all of (FR)

( * ) Notice: Subject to any disclaimer, the term of this patent is extended or adjusted under 35 U.S.C. 154(b) by 0 days.

(21) Appl. No.: 09/230,783
(22) PCT Filed: Jun. 29, 1998
(86) PCT No.: PCT/FR98/01384
  § 371 Date: Sep. 10, 1999
  § 102(e) Date: Sep. 10, 1999
(87) PCT Pub. No.: WO99/01249
  PCT Pub. Date: Jan. 14, 1999

(30) Foreign Application Priority Data

Jun. 30, 1997 (FR) ............................................. 97 08223

(51) Int. Cl.$^7$ ................................................ B23K 26/32
(52) U.S. Cl. ............................ 219/121.64; 219/121.61
(58) Field of Search ...................... 219/121.63, 121.64, 219/121.61, 121.62, 121.83, 121.13, 121.14

(56) References Cited

U.S. PATENT DOCUMENTS

| 4,684,779 A | * | 8/1987 | Berlinger et al. ....... 219/121.64 |
| 4,745,257 A | * | 5/1988 | Rito et al. ............. 219/121.64 |
| 5,142,119 A | * | 8/1992 | Hillman et al. ......... 219/121.64 |
| 5,183,991 A | * | 2/1993 | Arai ...................... 219/121.64 |

FOREIGN PATENT DOCUMENTS

| JP | 63-177992 | * | 7/1988 | ............ 219/121.64 |
| JP | 4-196049 | * | 7/1992 | |
| JP | 8-90265 | * | 4/1996 | |
| JP | 10-156566 | * | 6/1998 | |

* cited by examiner

Primary Examiner—Geoffrey S. Evans
(74) Attorney, Agent, or Firm—Steinberg & Raskin, P.C.

(57) ABSTRACT

Method for welding coated sheets with a laser beam in which an energy beam is directed on a welding zone of the sheets and is adapted to drive the coating steam vapor outward. The invention is particularly applicable in the field of vehicle manufacturing.

26 Claims, 3 Drawing Sheets

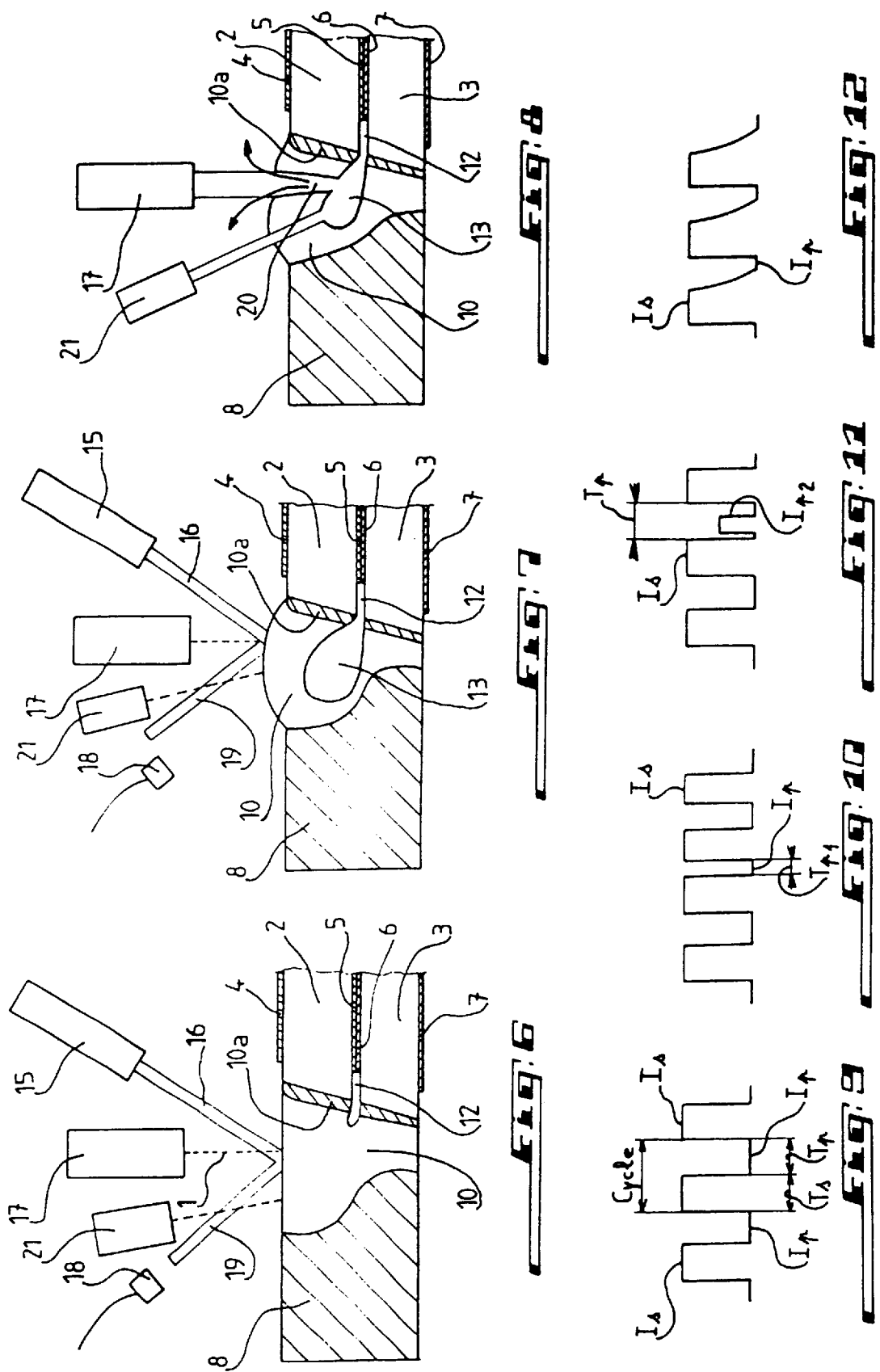

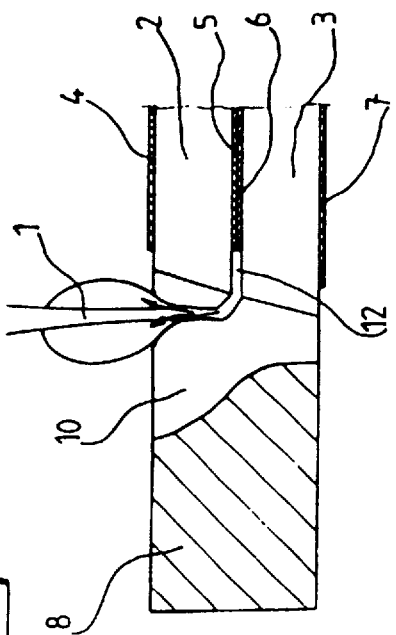
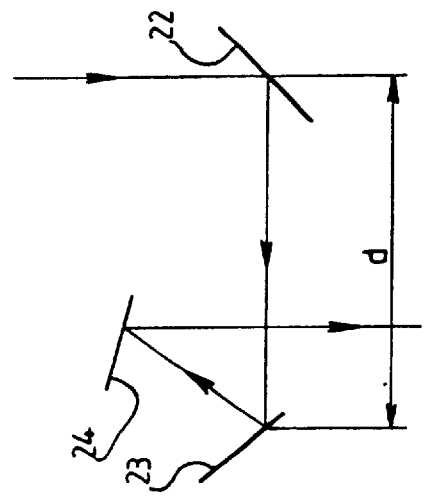
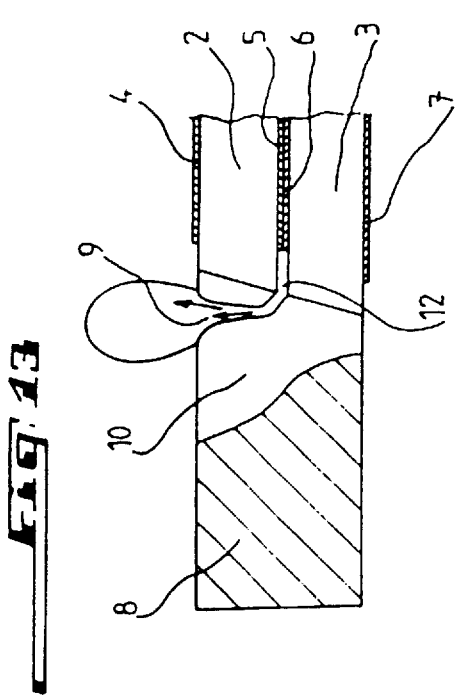
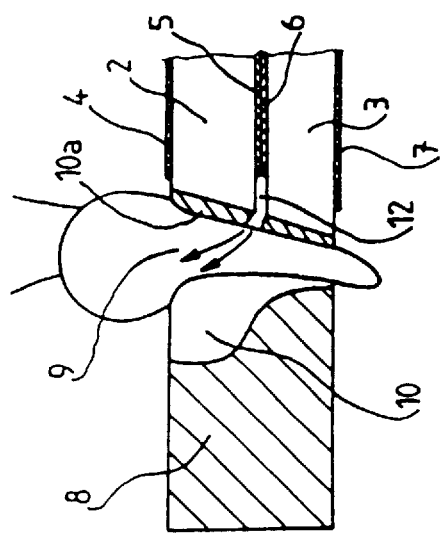
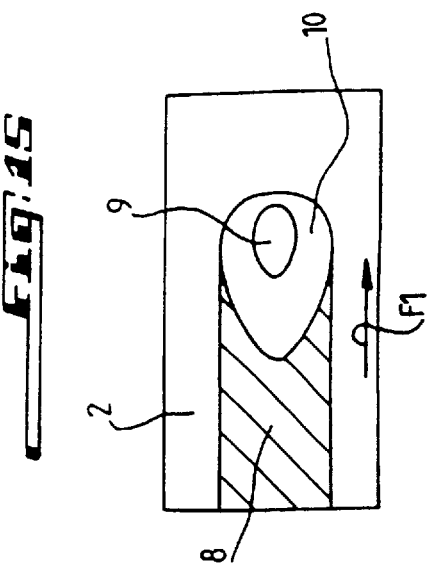

METHOD FOR WELDING COATED SHEETS WITH AN ENERGY BEAM, SUCH AS A LASER BEAM

FIELD OF THE INVENTION

The present invention relates to a method of welding lined metal sheets with an energy beam such for example as a laser beam.

BACKGROUND OF THE INVENTION

It is in particular applicable to the welding of galvanized metal sheets although it is also applicable to metal sheets lined with any other materials the evaporation temperature of which is lower than the melting temperature of the base material forming the metal sheets or of any multilayer structure exhibiting this characteristic feature.

FIGS. 1 and 2 show the welding with a laser beam 1, which operates in a pulsed or continuous mode, of two metal sheets 2, 3 comprising, on their two opposite sides, respectively, zinc coatings or linings 4, 5 ; 6, 7 and held tightly pressed onto each other by any suitable means in the vicinity of the location of the weld so that both internal linings 5, 6, be comprised between both metal sheets 2, 3. During the displacement of the welding beam 1 in the direction shown by the arrow F1, a weld bead 8 is carried out in order to connect the metal sheets 2, 3 to each other and a so-called capillary passage-way 9 is formed in the zone of molten metal 10. During the welding of the lined metal sheets 2, 3 with the laser beam operating in a continuous mode, owing to the fact that the evaporation temperature of the linings 4–7 is lower than the melting temperature of the base material forming both metal sheets 2, 3, zinc vapour 11 trapped between these two metal sheets pierces the wall of the liquid bath 10 as shown on FIG. 1 and enters the capillary 9 to hit the rear front of the latter as shown on FIG. 2, leading to a capillary which is no longer stable and to an ejection of the molten metal bath 10. The inventors have shown that the piercing of the wall of the liquid bath takes place in one or several tunnels 12 as shown on FIGS. 1 and 2. During the welding of the metal sheets 2, 3 with the laser beam operating in the pulsed mode, the zinc vapour formed during each welding impulse is discharged through the capillary without causing any instability of the liquid bath as shown on FIG. 1. During each pause impulse between two successive welding impulses of the energy beam, the capillary 9 closes as shown on FIG. 3.

It should be pointed out that during the pause impulse, the energy level of the beam is not necessarily zero and that it may still contribute to the welding.

However for the sake of convenience, one should use the expressions "welding impulse" and "pause impulse" in the present description to designate the high and low levels of the beam in the pulsed mode.

If the pressure of the zinc vapour is too low, this vapour remains confined in a zone about the liquid bath 10 as shown on FIG. 3. On the contrary if this vapour pressure exceeds a critical pressure, the zinc vapour enters the liquid bath 10 by forming a gas pocket 13 which reaches an equilibrium without any ejection of the liquid bath 10 (FIG. 4), or lifts and fully ejects the liquid bath 10 (FIG. 5). The reference numeral 14 designates a device for feeding gas directed towards the liquid bath 10 and known per se.

It should be noted that during the pause impulse, that portion 10a of the liquid zone 10 which is located towards the place where the metal sheets are not yet welded, may begin to become solidified : that is why it has been hatched on FIGS. 3 to 8.

Many solutions have been proposed for removing the inconveniences due to the uncontrolled evolution of the zinc vapours leading to a weld of bad quality.

One of these known solutions consists in providing, prior to welding, a play or clearance between the metal sheets to be welded to permit the discharge of the zinc vapours. This known solution however has the inconveniences of providing an additional operation of forming bosses for example through pressing on the metal sheets for the formation of the play or clearance and of requiring an appliance adapted for that operation.

Another known solution consists in removing the zinc lining at the location of the weld and in replacing it by a different lining such for example as a nickel alloy. This solution has the inconvenience of causing an excess cost and of being complex owing to the fact of depositing a different lining at some places of the metal sheets.

According to still another known solution, the metal sheets to be welded are arranged vertically and the welding energy beam moves from bottom to top so that the molten material flows away through gravity thereby having the effect of improving the discharge of the zinc vapour. This solution requires a particular mounting in order that the metal sheets be arranged vertically and possibly in the case of complex parts and/or parts with a great size such as doors of automotive vehicles, to modify the orientation of the part in order that the welding energy beam always moves from bottom to top or upwards.

OBJECTS AND SUMMARY OF THE INVENTION

The object of the present invention is to remove the inconveniences referred to hereinabove of the known solutions by making use of a method of welding lined metal sheets by means of an energy beam which permits to obtain a good weld quality without any adaptation of the geometry of the parts and without using any more or less additional equipment for holding the metal sheets to be welded.

For that pupose, the invention provides a method of welding with an energy beam metal sheets lined or coated with a material having an evaporation temperature lower than the melting temperature of the material of the metal sheets so that the lining material would evaporate during the welding by generating vapour present in the capillary formed by the molten weld material and which is characterized in that it consists in providing an energy beam directed onto the welding zone and adapted so as to promote the discharge of the vapour to the outside in particular through the capillary.

Preferably the energy beam permitting to promote the discharge of the vapour of the material of the lining is the welding energy beam.

According to one embodiment in the case where the energy beam operates in the pulsed mode, the method consists in detecting or providing a modification of the surface of the molten material and in operating the energy beam so that the impulses emitted by the latter may effect a piercing in the molten material when a determined lifting of the surface of this material has been sensed or has been provided in order to discharge the vapour of the lining material present in a pocket of the molten material.

The operation of piercing the surface of the molten material is carried out by decreasing the width of each pause impulse between two consecutive welding impulses of the energy beam or by introducing an additional impulse during the duration of each pause impulse between two consecutive welding impulses of the energy beam.

Preferably the detection of the modification of the surface of the molten material is effected by a source of emission of an incident beam directed towards the molten weld material and a sensor adapted to measure the directional variations of intensity or of shape of the beam reflected by the surface of the molten material, this incident beam advantageously being a laser beam and the sensor advantageously being a photodiode.

The provision of modification of the surface of the molten material is effected by measuring the amount of vapour discharged from the lining material during the welding and by comparing it with a predetermined vapour amount to be discharged of this material, the measurement of the discharged vapour amount being preferably effected by a spectroscopic process.

According to an alternative embodiment still in the case where the energy beam operates in the pulsed mode, the method consists in controlling the energy beam so that the impulses emitted thereby be adapted to effect the piercing of any vapour pocket of the lining material present in the molten weld material during each pause impulse between two consecutive welding impulses of the energy beam in order to discharge the vapour from the material of the lining.

According to still another alternative embodiment according to which the energy beam always operates in a pulsed mode, the method consists in controlling the energy beam so that the impulses emitted by the latter be adapted to put in permanent communication during each pause impulse between two consecutive welding impulses of the energy beam, the capillary and at least one tunnel formed by the vapour pressure of the lining material in the molten interfaces own of two metal sheets to be welded in order to obtain a discharge of the vapour of this material during each pause impulse.

According to either one of the two alternative embodiments mentioned hereinabove, the method consists in decreasing the width of each pause impulse of the energy beam or in introducing an additional impulse during the duration of each pause impulse of the energy beam for piercing the aforesaid vapour pocket or keeping the communication between the aforesaid capillary and tunnel.

The energy beam permitting to promote the discharge of the vapour is arranged so as to provide a capillary having a shape permitting this discharge without any disturbance.

The capillary exhibits a cross section elongated in the direction of displacement of the welding energy beam.

The beam exhibits a substantially elliptical cross section the major axis of which is directed in the direction of the displacement of the welding energy beam.

According to one alternative embodiment, the aforesaid energy beam is inclined in relation to the horizontal for producing the elliptic capillary.

According to another alternative embodiment, one provides one or several cylindrical or aspherical lenses, one or several cylindrical or aspherical mirrors or diffractive optical elements on the path of travel of the energy beam for providing the elliptic capillary.

According to still another alternative embodiment, the aforesaid energy beam oscillates in the direction of the welding energy beam to produce the elliptic capillary.

Still according to another alternative embodiment, one provides at least another energy beam co-operating with the aforesaid first energy beam to produce the elliptic capillary.

Each aforesaid energy beam preferably is a laser beam.

BRIEF DESCRIPTION OF THE DRAWINGS

The invention will be better understood and further objects, characterizing features, details and advantages thereof will appear more clearly as the following explanatory description proceeds with reference to the attached diagrammatic drawings given by way of none limiting examples only illustrating several embodiments of the invention and in which:

FIGS. 6 to 8 show one embodiment of the invention permitting to detect a lifting of the molten bath and to pierce the molten bath to discharge the zinc vapour present in the pocket of this bath;

FIG. 9 shows a normal train of welding impulses of the welding energy beam operating in the pulsed mode for welding two metal sheets;

FIGS. 10 to 12 show each one a modified train of impulses of the welding energy beam in the pulsed mode permitting to pierce the zinc vapour pocket in the molten bath;

FIGS. 13 and 14 show an alternative embodiment of the invention according to which the welding energy beam permits to keep a communication between the capillary and a tunnel formed in the interface of both metal sheets to be welded during each pause impulse of this beam to promote the discharge of the zinc vapour;

FIG. 15 is a top view according to the arrow XV of FIG. 1 and showing an embodiment of the invention permitting to modify the shape in cross section of the capillary to promote the discharge of the zinc vapour:

FIG. 16 is a view in section similar to FIGS. 1 to 8, but in the embodiment of FIG. 15 ; and FIG. 17 shows an optical system permitting to obtain a beam with an elliptic cross section.

DETAILED DESCRIPTION OF THE PREFERRED EMBODIMENTS

Figure 1:
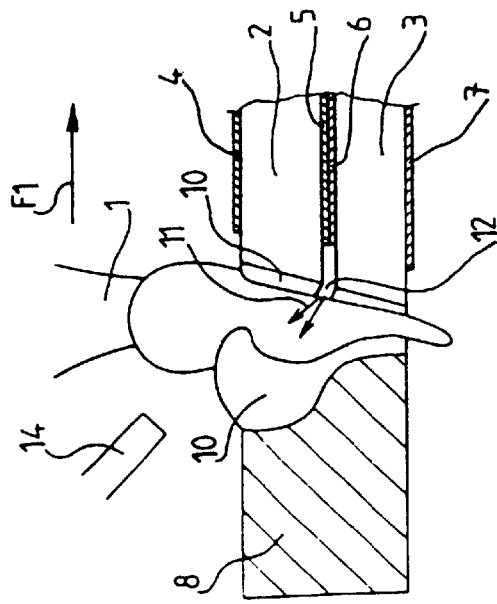
FIG. 1 shows a method of welding lined metal sheets with a laser beam with formation of vapour originating from the evaporation of the material of the linings of the metal sheets.

The method of the invention permitting to weld lined metal sheets by means of an energy beam such as a laser beam or an electron beam by avoiding the ejections of the metal bath is described with reference to two different embodiments, the one using a welding energy beam operating in the pulsed mode and the other one using such a beam operating as well in the pulsed mode as in the continuous mode.

The first embodiment of the method of the invention where the energy beam operates in the pulsed mode only will be described with reference to FIGS. 6 to 8, of which the portions common with those already described in the method of welding of FIGS. 1 to 5 carry the same reference numerals.

According to this embodiment, one detects the lifting of the liquid bath 10 during the formation of the zinc vapour pocket 13 within this bath during the time of pause of the impulses of the incident energy beam by using a source 15 emitting an incident beam 16 such a HeNe-laser beam in the direction of the liquid bath 10. The source 15 is of course different from the source 17 used for the welding and there is also provided a detector 18, such for example as a photodiode permitting to measure the directional variations of intensity or of shape of the beam 19 reflected by the surface of the liquid bath 10. The electric signals provided by the detector 18 and representative of such variations are applied to a processing circuit (not shown) adapted to control the source 17 or an accessory source of an energy beam so that the impulses emitted by that source permit to pierce the zinc vapour pocket 13 through the liquid bath 10 and to discharge the zinc vapour to the outside when the surface of the liquid bath 10 is lifted to a determined height. More precisely when the surface of the liquid bath 10 is lifted by the pocket 13 as shown on FIG. 7, the reflected beam 19 may be deviated by the bulged shape of the surface of the bath 10 so as to no longer hit the sensor 18 or as to hit it under a different angle. Under these conditions, the detector 18 does no longer provide any electric signal or provides a modified signal so that the processing circuit operates the source 17 or the auxiliary source in order that the energy beam carries out during the duration Tp of each pause impulse Ip of the train of impulses shown on FIG. 9 between two successive welding impulses Is, a piercing 20 in the upper layer of the liquid bath 10 and opening into the pocket 13 (FIG. 8). Such a piercing may be effected during each pause impulse by decreasing the width of the duration of the pause impulse Ip as shown at Tp 1 on FIG. 10 or by introducing during the duration Tp of the pause impulse of low level Ip an additional impulse Ip2 as shown on FIG. 11 and having a width and a level of intensity defined so as to pierce the bubble-shaped portion only of the liquid bath 10 for reaching the pocket 13. The detection of the rise of the liquid bath 10 under the effect of the zinc vapour pocket 13 may of course be effected by any other optical or image processing device, for example by a video camera, by interferometry, etc . . . , these devices being preferably integrated into the optical head for focusing the welding beam. On FIGS. 6 to 8 has been shown the auxiliary source of laser beam 21 used to promote the discharge of the zinc vapour and preferably located rearwards of the capillary 9 since one has found that the vapours are more easily discharged at the rear of this capillary.

According to one alternative of the first embodiment of the invention the piercing of the zinc vapour pocket 13 through the liquid bath 10 is effected by detection with the assistance of suitable means of the disappearance of the wavelets at the surface of the liquid bath. In effect a possible inflation of the liquid bath would smooth the irregularities at the surface of the latter due to hydrodynamic stirrings. The wavelets are vanishing or becoming thinner under the action of the surface tension forces and the detection of any modification of the surface of the bath 10 could disclose a formation of a zinc vapour pocket 13. Such an information could be sensed and processed as described in the foregoing alternative embodiment by adapting the train of impulses of the energy beam preferably the welding beam as shown on FIG. 10 or on FIG. 11.

According to another alternative of this embodiment, the piercing of the zinc vapour pocket 13 may be effected by foreseeing the lifting of the liquid bath 10 through the measurement of the previously discharged amount of zinc vapour. In effect as already explained previously, the welding operation results in the evaporation at the interface of the metal sheets to be welded 2, 3, of some amount of the zinc lining. If the amount of zinc vapour discharged during each pause impulse of the energy beam is lower than the predetermined amount to be discharged, an ejection of the liquid bath 10 is predictable. Under these conditions, the result of such a comparison is exploited so as to decrease the duration of each pause impulse as shown on FIG. 10 or to introduce an additional impulse into the pause impulse as shown on FIG. 11 for carrying out during each pause impulse the piercing 20 for discharging the zinc vapour present in the pocket 13. The amount of zinc discharged during the welding may be measured by a spectroscopic process after standardization by an analysis in a state of stable condition.

Still according another alternative of the first embodiment of the invention, the piercing 20 of the zinc vapour pocket 13 instead of being carried out after detection in real time of the lifting of the bath 10 as explained with reference to FIGS. 6 to 8, may be carried out permanently in a sytematic manner in each welding cycle Ts+Tp of the train of impulses emitted by the welding energy source 17 or the accessory source. Thus during the duration Tp of the pause impulse Ip of this train of impulses, at least one impulse of adapted shape Ip2 may be introduced as shown on FIG. 11 to carry out the piercing 20.

According to a last alternative of this embodiment of the invention, the discharge of the zinc vapour may also be effected by maintaining a communication between the capillary 9 of the liquid bath 10 and the tunnel 12 formed as previously explained with reference to FIGS. 1 and 2. For that purpose the shape of the train of impulses emitted by the welding energy beam or the external energy beam will be selected so as to be in accordance with that of the train of impulses of FIG. 11 or to that of the train of impulses of FIG. 12 which are shapes of trains of impulses given by way of example. Thus during each welding cycle, the pause impulse Ip is adapted for providing the permanent connection or communication between the tunnel 12 and the capillary 9 as shown on FIG. 13. FIG. 14 shows the energy beam with an emission by impulses 1 delivered by the welding source or by the external source and of which the impulses are generated according to the train of impulses of FIG. 11 or of FIG. 12 to provide the permanent communication between the tunnel 12 and the capillary 9.

According to the second embodiment of the invention, the energy beam permitting to weld the lined metal sheets 2, 3 as well in the mode of pulsed operation as a in the mode of continuous operation by improving the exhaust of the zinc vapour through the capillary 9 and by thus avoiding the ejections of the liquid bath 10, is adapted to provide the capillary 9 so that it exhibits in cross section an elongated in particular substantially elliptic shape as shown on FIG. 15, the major axis of this elliptic shape being directed in the direction of displacement of the welding energy beam symbolized by the arrow F1. The energy beam permitting to provide the elliptic capillary 10 may be supplied by the welding source or an external source and preferably is a laser beam. The energy distribution of this elliptic section of the capillary 10 is determined to permit a welding process while lengthening the capillary in order to not disturb the outflow of the vapour of the lining, to decrease the influence of the metal vapour during its discharge upon the stability of the welding method and to thus increase the flow rate owing to a greater section of the capillary 9. One has found that one obtained a stable capillary with a beam having an elongated section, which is not always the case with a beam with a circular section.

Figure 2:
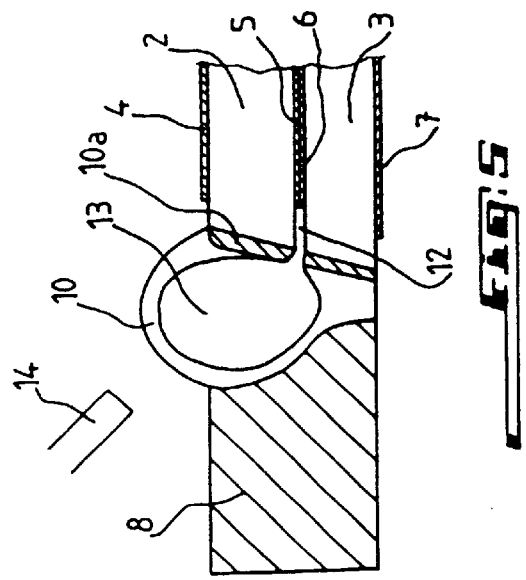
FIG. 2 shows the effect of ejection of the molten material during the welding by the vapour of the material of the linings of the metal sheets.
Figure 3:
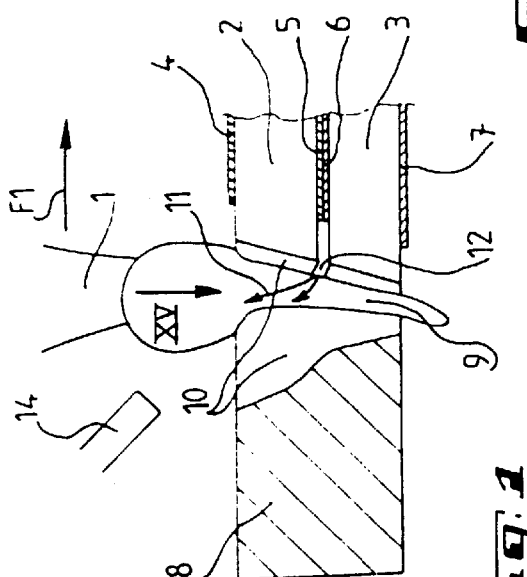
FIG. 3 shows the state of the welding during a pause impulse between two consecutive welding impulses of the energy beam with the zinc vapour confined in a zone about the molten bath.
Figure 4:
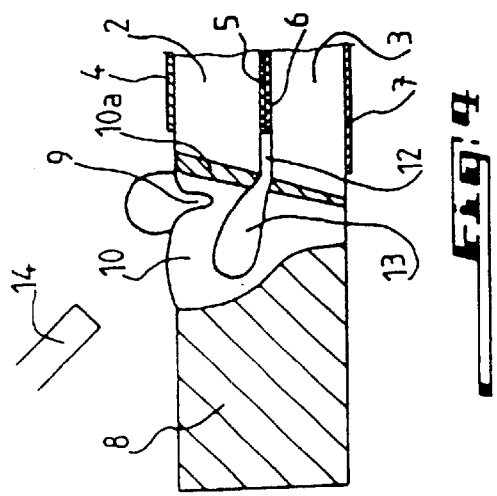
FIG. 4 shows the formation of a zinc vapour pocket formed in the molten bath during one pause impulse of the energy beam without causing any ejection of this bath.
Figure 5:
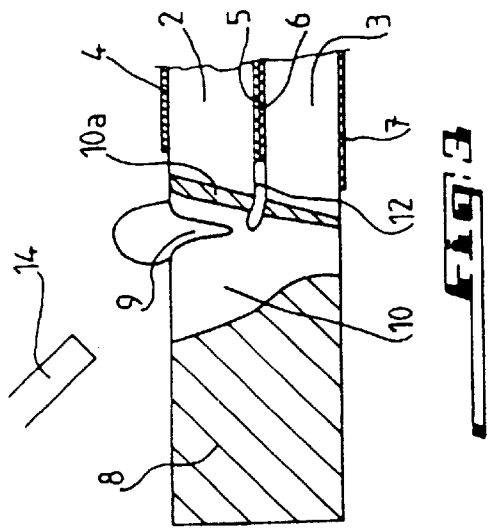
FIG. 5 shows the formation of a zinc vapour pocket in the molten bath such as it fully ejects this bath.

On FIG. 16 it is seen that owing to this increase of section, the zinc vapours are more easily exhausted and/or hit the rear front of the capillary without deforming it and/or without risking ejections of liquid as in the case for example of FIG. 2.

The elongated in particular elliptic shape of the capillary 9 may be provided by different techniques. One of these techniques consists in using an energy beam with a circular section but inclined in relation to the top face of the metal sheet 2 so that the horizontal section of this beam be elliptic. Another technique consists in providing one or several cylindrical or aspherical lenses, one or several cylindrical or aspherical mirrors or diffractive elements or any other similar device arranged in the path of travel of the energy beam so as to generate the elliptic shape of the capillary 9 during the welding operation.

FIG. 17 shows an optical system permitting to provide an elliptic beam. This system comprises two cylindrical mirrors 22 and 23 forming in a known manner a telescope so that the beam they are forming has a defined length-over-width ratio and a conventional parabolic mirror 24 which focuses this beam onto a point. The distance d between both mirrors 22 and 23 is adjustable and thus permits to have a focusing along the major axis and the minor axis of the ellipse at the same place. In other words, the astigmatism may be set if need be to zero.

The interest of this optical system is to possess a focusing system and a system generating the ratio referred to hereinabove well being independent of each other. One may change the ratio or change the focusing by keeping an identical ratio. It should be noted that the angles of incidence of the beam upon the mirrors are optimized so that the optical system is easily adjusted and minimizes the optical aberrations.

Still another technique consists in using an energy beam oscillating in the direction of displacement of the welding so as to produce the elliptic shape of the capillary 9.

At last two or several energy beams having suitable positions and angles of attack may be used for creating the elliptic capillary 9.

Thus an optimization of the elliptic shape of the capillary 9 permits a discharge of the zinc vapour without disturbing the metal bath 10 and to increase the exhaust flow rate of the vapour of the material of the lining.

It should at last be pointed out that the intensity distribution in the section of the welding beam will be such that it permits the welding while optimizing it in order to save energy: one has found that the best results are obtained with the strongest intensity of the beam forward of the latter with respect to its directional displacement.

What is claimed is:

1. A method of welding with an energy beam comprising the steps of:
   providing metal sheets (2,3) lined with a material (4–7) having an evaporation temperature lower than the melting temperature of the material of the metal sheets (2, 3) so that the material of the lining (4–7) evaporates during a welding process thereby forming vapor present in a capillary (9) formed by the molten weld material; and
   providing an energy beam (1) directed onto a welding zone, said energy beam being adapted so as to vaporize said lining material and promote the discharge of vapor from the welding zone out through the capillary (9).

2. A method according to claim 1, wherein the energy beam permitting to promote the discharge of the vapour of the material of the lining (4–7) is the welding energy beam (1).

3. A method according to claim 1, wherein the energy beam (1) operates in the pulsed mode and wherein the improvment consists in detecting or foreseeing a modification of the surface of the molten material (10) and in controlling the energy beam (1) so that the impulses emitted by the latter may effect a piercing (20) in the molten material (10) when a determined lifting of the surface of this material has been sensed or has been foreseen in order to discharge the vapour of the lining material present in a pocket (13) of the molten material (10).

4. A method according to claim 3, consisting in piercing the surface of the molten material (10) by decreasing the width (Tp) of each pause impulse (Ip) between two consecutive welding impulses (Ts) of the energy beam (1) or by introducing an additional impulse (Ip2) during the duration of each pause impulse (Ip) between two consecutive welding impulses (Is) of the energy beam (1).

5. A method according to claim 3, consisting in sensing the modification of the surface of the molten material (10) by a source (15) of emission of an incident beam (16) directed towards the molten weld material (10) and a detector (18) adapted to measure the directional variations of intensity or of shape of the beam (19) reflected by the surface of the molten material (10).

6. A method according to claim 5, wherein the incident beam (16) of the aforesaid source (15) is a laser beam and the aforesaid detector (18) is a photodiode.

7. A method according to claim 3, consisting in foreseeing the modification of the surface of the molten material (10) by measuring the discharged amount of vapour of the material of the lining during the welding and by comparing it with a predetermined discharged amount of vapour of this material.

8. A method according to claim 7, consisting in measuring the discharged amount of vapour by a spectroscopic process.

9. A method according to claim 1, according to which the energy beam (1) operates in the pulsed mode and consisting in controlling the energy beam (1) so that the impulses emitted by the latter be adapted to effect the piercing (20) of any pocket (13) of vapour of the material of the lining present in the molten welded material (10) during each pause impulse (Ip) between two consecutive welding impulses (Is) of the energy beam in order to discharge the vapour of the material of the lining.

10. A method according to claim 1, according to which the energy beam (1) operates in the pulsed mode, consisting in controlling the energy beam (1) so that the impulses emitted by the latter be adapted to put in permanent communication during each pause impulse (Ip) between two consecutive welding impulses (Is), the capillary (9) and at least one tunnel (12) formed by the vapour pressure of the material of the lining in the molten interface zone of both metal sheets to be welded (2,3) in order to obtain a discharge of vapour of this material during each pause impulse (Ip).

11. A method according to claim 9, consisting in decrasing the width of each pause impulse (Ip) of the energy beam (1) or in introducing an additional impulse (Ip2) during the duration of each pause impulse (Ip) for piercing the aforesaid vapour pocket (13) or maintaining the communication between the aforesaid capillary (9) and tunnel (12).

12. A method according to claim 1, wherein the energy beam (1) permitting to promote the discharge of the vapour is arranged so as to provide a capillary (9) having a shape permitting this discharge without any disturbance.

13. A method according to claim 12, wherein the capillary (9) exhibits a cross section elongated in the direction of displacement of the welding energy beam.

14. A method according to claim 13, wherein the beam exhibits a substantially elliptic cross section the major axis of which is directed in the direction of the displacement of the welding energy beam.

15. A method according to claim 14, wherein the aforesaid energy beam (1) is inclined in relation to the horizontal for producing the elliptic capillary (9).

16. A method according to claim 14, consisting in providing one or several cylindrical or aspherical lenses, one or several cylindrical or aspherical mirrors or diffractive optical elements in the path of travel of the energy beam to provide the capillary of elliptic shape (9).

17. A method according to claim 14, wherein the energy beam (1) oscillates in its direction of displacement for producing the elliptic capillary (9).

18. A method according to claim 14, consisting in providing at least another energy beam co-operating with the aforesaid first energy beam (1) to produce the elliptic capillary (9).

19. A method according to claim 1, wherein the energy beam adapted to promote the discharge of vapor is a laser beam.

20. A method of welding, with an energy beam, metal sheets (2,3) lined with a material (4–7) having an evaporation temperature lower than the melting temperature of the material of the metal sheets (2, 3) so that the material of the lining (4–7) evaporates during the welding by creating vapor present in a capillary (9) formed by the molten weld material (10), wherein the method comprises the step of:

providing an energy beam (1) directed onto a welding zone, said energy beam being adapted to promote the discharge of the vapor present in the capillary (9), formed by the molten weld material, out through the capillary (9), wherein the energy beam (1) operates in a pulse mode;

detecting or foreseeing a modification in a surface of the molten weld material (10); and controlling the energy beam (1) such that the impulses emitted by the energy beam (1) effect a piercing (20) in the molten weld material (10) when a determined lifting of the surface of the molten weld material (10) has been sensed in order to discharge the evaporated lining material present in a pocket (13) of the molten weld material (10).

21. A method of welding, with an energy beam, metal sheets (2,3) lined with a material (4–7) having an evaporation temperature lower than the melting temperature of the material of the metal sheets (2, 3) so that the material of the lining (4–7) evaporates during the welding by creating vapor present in a capillary (9) formed by the molten weld material (10), wherein the method comprises the step of:

providing an energy beam (1) directed onto a welding zone, said energy beam being adapted to promote the discharge of the vapor present in the capillary (9), formed by the molten weld material, out through the capillary (9), wherein the energy beam (1) operates in the pulse mode; and controlling the energy beam (1) such that the impulses emitted by the energy beam (1) effect a piercing (20) of any pocket (13) of the evaporated lining material present in the molten weld material (10) during a pause impulse (Ip) between two consecutive welding impulses (Is) of the energy beam (1) in order to discharge the vapor of the material of the lining from the molten weld material (10).

22. A method of welding, with an energy beam, metal sheets (2,3) lined with a material (4–7) having an evaporation temperature lower than the melting temperature of the material of the metal sheets (2, 3) so that the material of the lining (4–7) evaporates during the welding by creating vapor present in a capillary (9) formed by the molten weld material, wherein the method comprises the step of:

providing an energy beam (1) directed onto a welding zone, said energy beam being adapted to promote the discharge of the vapor present in the capillary (9), formed by the molten weld material, out through the capillary (9), wherein the energy beam (1) operates in the pulsed mode;

controlling the energy beam (1) such that the pulses emitted by the energy beam (1) effect a piercing (20) of any vapor pocket (13) of the evaporated lining material present in the molten weld material (10) during each pause impulse (Ip) between two consecutive welding impulses (Is) of the energy beam in order to discharge the vapor of the material of the lining from the molten weld material (10); and one of decreasing a width of each pause impulse (Ip) of the energy beam (1) and introducing an additional impulse (Ip2) during the duration of each pause impulse (Ip) for one of piercing the vapor pocket (13) and maintaining the communication between the capillary (9) and a tunnel (12) of vapor.

23. A method of welding, with an energy beam, metal sheets (2,3) lined with a material (4–7) having an evaporation temperature lower than the melting temperature of the material of the metal sheets (2, 3) so that the material of the lining (4–7) evaporates during the welding by creating vapor present in a capillary (9) formed by the molten weld material (10), wherein the method comprises the step of:

providing an energy beam (1) directed onto a welding zone, said energy beam being adapted to promote the discharge of the vapor present in the capillary (9), formed by the molten weld material, out through the capillary (9), wherein the energy beam (1) operates in a pulse mode; and controlling the energy beam (1) such that the impulses emitted by the energy beam (1) are adapted to place in permanent communication, during each pause impulse (Ip) between two consecutive welding impulses (Is), the capillary (9) and at least one tunnel (12) formed by the vapor pressure of the material of the lining in a molten interface zone between the metal sheets to be welded (2,3) in order to obtain a discharge of vapor of the evaporated lining material during each pause impulse (Ip).

24. A method of welding, with an energy beam, metal sheets (2,3) lined with a material (4–7) having an evaporation temperature lower than the melting temperature of the material of the metal sheets (2, 3) so that the material of the lining (4–7) evaporates during the welding by creating vapor present in a capillary (9) formed by the molten weld material (10), wherein the method comprises the step of:

providing an energy beam (1) directed onto a welding zone, said energy beam being adapted to promote the discharge of the vapor present in the capillary (9), formed by the molten weld material, out through the capillary (9), wherein the energy beam (1) operates in a pulse mode;

controlling the energy beam (1) such that the impulses emitted by the energy beam (1) are adapted to place in permanent communication, during each pause impulse (Ip) between two consecutive welding impulses (Is), the capillary (9) and at least one tunnel (12) formed by the vapor pressure of the material of the lining in a molten interface zone between the metal sheets to be welded (2,3) in order to obtain a discharge of vapor the evaporated lining material during each pause impulse (Ip); and one of decreasing a width of each pause impulse (Ip) of the energy beam (1) and introducing an additional impulse (Ip2) during the duration of each pause impulse (Ip) for one of piercing the vapor pocket (13) and maintaining the communication between the capillary (9) and at least one of said tunnels (12).

25. A method of welding, with an energy beam, metal sheets (2,3) lined with a material (4–7) having an evaporation temperature lower than the melting temperature of the material of the metal sheets (2, 3) so that the material of the lining (4–7) evaporates during the welding by creating vapor present in a capillary (9) formed by the molten weld material (10), wherein the method comprises the step of:

providing an energy beam (1) directed onto a welding zone, said energy beam being adapted to promote the discharge of the vapor present in the capillary (9), formed by the molten weld material, out through the capillary (9), and wherein the energy beam (1) is arranged so as to provide a capillary (9) having a shape permitting the discharge of the vapor without any disturbance.

26. A method of welding, with an energy beam, metal sheets (2,3) lined with a material (4–7) having an evaporation temperature lower than the melting temperature of the material of the metal sheets (2, 3) so that the material of the lining (4–7) evaporates during the welding by creating vapor present in a capillary (9) formed by the molten weld material (10), wherein the method comprises the step of:

providing an energy beam (1) directed onto a welding zone, said energy beam being adapted to promote the discharge of the vapor present in the capillary (9), formed by the molten weld material, out through the capillary (9), wherein the energy beam (1) is arranged so as to provide a capillary (9) having a shape permitting the discharge of the vapor without any disturbance, the capillary (9) having a cross section which is elongated in the direction of displacement of the welding energy beam, and wherein the energy beam (1) has a substantially elliptic cross section having a major axis and a minor axis, the major axis of which is directed in the direction of displacement of the welding energy beam.

* * * * *